(12) United States Patent
Scarisbrick et al.

(10) Patent No.: US 8,897,450 B2
(45) Date of Patent: Nov. 25, 2014

(54) SYSTEM, PROCESSING DEVICE, COMPUTER PROGRAM AND METHOD, TO TRANSPARENTLY ENCRYPT AND STORE DATA OBJECTS SUCH THAT OWNERS OF THE DATA OBJECT AND PERMITTED VIEWERS ARE ABLE TO VIEW DECRYPTED DATA OBJECTS AFTER ENTERING USER SELECTED PASSWORDS

(71) Applicant: VeriFyle, Inc., Saratoga, CA (US)

(72) Inventors: Aaron M. Scarisbrick, Boise, ID (US);
Roy E. Martin, Saratoga, CA (US);
Thomas M. Root, Boise, ID (US);
Stephen J. Pierce, Milpitas, CA (US)

(73) Assignee: VeriFyle, Inc., Saratoga, CA (US)

( * ) Notice: Subject to any disclaimer, the term of this patent is extended or adjusted under 35 U.S.C. 154(b) by 230 days.

(21) Appl. No.: 13/719,705

(22) Filed: Dec. 19, 2012

(65) Prior Publication Data

US 2014/0169554 A1  Jun. 19, 2014

(51) Int. Cl.
*H04L 29/06* (2006.01)
*H04L 9/08* (2006.01)

(52) U.S. Cl.
CPC ............ *H04L 9/0863* (2013.01); *H04L 9/0822* (2013.01); *H04L 9/0841* (2013.01); *H04L 9/0894* (2013.01)
USPC ........................................................ 380/277

(58) Field of Classification Search
CPC .... H04L 9/0822; H04L 9/0863; G06F 21/602
USPC ........................................................ 380/277
See application file for complete search history.

(56) References Cited

U.S. PATENT DOCUMENTS

| 6,230,269 | B1 * | 5/2001 | Spies et al. ..................... 713/182 |
| 6,453,416 | B1 * | 9/2002 | Epstein ......................... 713/170 |
| 6,490,680 | B1 * | 12/2002 | Scheidt et al. ................. 713/166 |
| 6,829,712 | B1 * | 12/2004 | Madoukh ......................... 726/2 |
| 2003/0046238 | A1 * | 3/2003 | Nonaka et al. ................... 705/51 |
| 2004/0039911 | A1 * | 2/2004 | Oka et al. ...................... 713/175 |
| 2006/0104441 | A1 * | 5/2006 | Johansson et al. .............. 380/44 |

* cited by examiner

*Primary Examiner* — Hadi Armouche
*Assistant Examiner* — Dao Ho
(74) *Attorney, Agent, or Firm* — Schwegman Lundberg & Woessner, P.A.

(57) ABSTRACT

A cryptographic system makes everyday data objects, such as a document or conversation, unreadable to anyone other than the owner or those currently having permission to access the data objects. The cryptographic system is transparent by requiring no additional effort on the part of any user in the encryption/decryption process other than entering a user identifier and password. Each document is encrypted with a unique encryption key. Changes to data object access permissions are immediately honored and enforced by enabling or disabling access to certain decryption keys. Decryption of data objects requires information known only to the owner of the data object or those permitted to access the data object. This decryption information is not stored anywhere in the system.

21 Claims, 7 Drawing Sheets

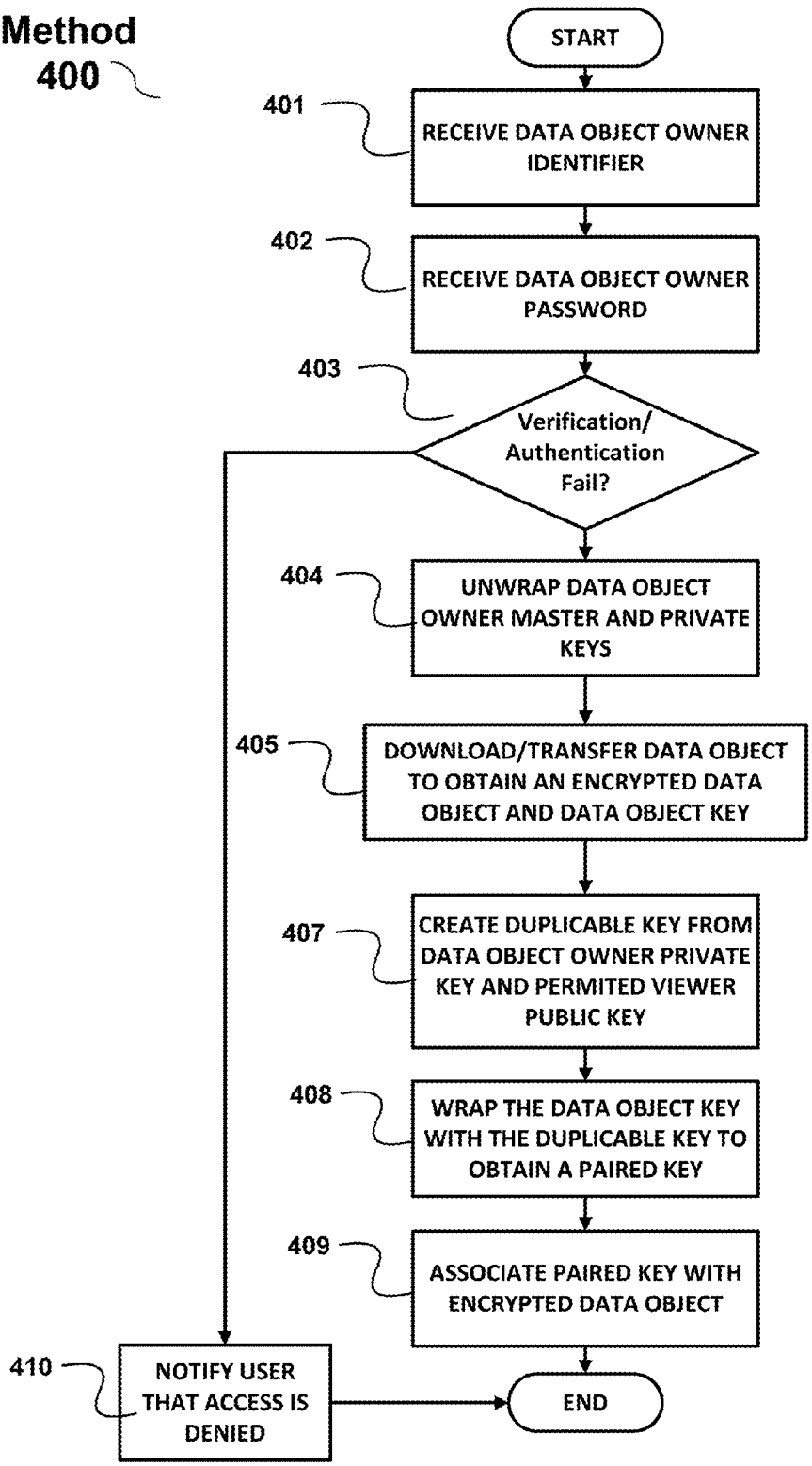

SYSTEM, PROCESSING DEVICE, COMPUTER PROGRAM AND METHOD, TO TRANSPARENTLY ENCRYPT AND STORE DATA OBJECTS SUCH THAT OWNERS OF THE DATA OBJECT AND PERMITTED VIEWERS ARE ABLE TO VIEW DECRYPTED DATA OBJECTS AFTER ENTERING USER SELECTED PASSWORDS

BACKGROUND

1. Field

This invention relates to cryptographic systems.

2. Description of Related Art

Encrypting documents to be exchanged often requires the difficult task of keeping track of and managing encryption software and sets of encryption and decryption keys. Typically a user must first obtain a set of keys as well as complex encryption software and then know which keys to use in encrypting and decrypting information. Often a user may spend a large amount of time managing encrypting and decrypting information. A user may forget which keys to use or how to use the encryption/decryption software if the user has not used the application recently. A user may likewise lose or forget where the necessary keys are stored.

Further, the encrypted information and/or keys may be transferred on various unsecured media between processing devices or systems that may allow for interception of keys and encrypted information. This interception of the keys and/or encrypted information may lead to the unauthorized decryption of encrypted information. For public systems, authentication and certification of publicly available keys requires additional effort to prevent passive theft of data and tampering with data during transmission and storage.

Also, it may be difficult to remove authorization or permissions for particular users to decrypt encrypted information. If encrypted information is being transferred to multiple users at various processing devices and then one user should no longer be permitted access to the information, new encryption/decryption software and/or keys may have to be sent to all the other users in order to make sure that the disallowed user is not likely to obtain the information. This is typically only possible with public, two-way systems. Most document encryption sharing systems (that are not public) are one-way. Once a user has access, they generally always have access. There is generally no way to revoke a user's permission in RSA methods or other similar cryptography methods.

DESCRIPTION OF THE DRAWINGS

FIGS. 4A-B are flow charts illustrating a method of encrypting and decrypting data objects according to an embodiment.

Figure 1:
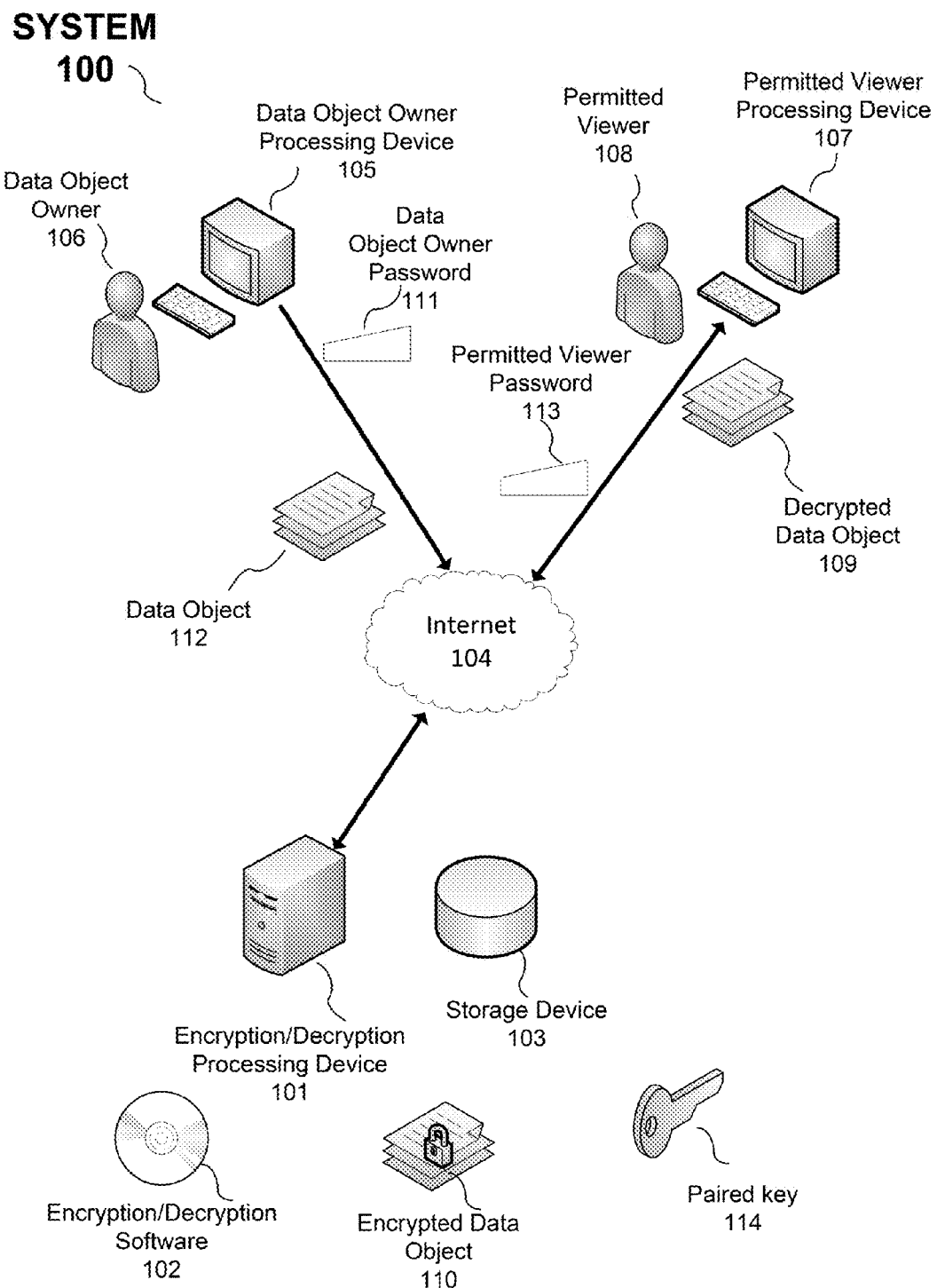
FIG. 1 illustrates a system to receive and provide data objects between object owners and permitted viewers, and to encrypt and decrypt them for selected users permitted access to data objects by the data object's owner according to an embodiment.

In the following description, numerous specific details are set forth in order to provide a thorough understanding of embodiments. It will be obvious, however, to one skilled in the art, that embodiments may be practiced without some or all of these specific details. In other instances, well known process steps have not been described in detail in order not to unnecessarily obscure a particular embodiment.

DETAILED DESCRIPTION

Secure exchange of files and documents can become unmanageable when the number of people and documents grow and permissions to view vary from document to document and individual to individual. Using encryption keys to serve the dual roles of keeping data objects secure and controlling individual access to them limits the complexity of the networks that can be practically managed. It may become impractical to manage all of the keys and updates that occur as the number of people, documents, and permissions grow.

Another issues that arises is increased demand for storage caused by a proliferation of document versions. If documents are encrypted and then sent to many people, revisions can require multiple versions to accumulate for each person involved. In addition, managing the document sharing process becomes increasingly difficult with the proliferation of revisions and versions.

Encrypting documents to be exchanged doesn't necessarily provide privacy or security. For example, if decryption keys are stolen, the encrypted documents or data objects can be read.

Embodiments of the present invention separates managing data objects and controlling permission to access them from the transparent methods that encrypt and decrypt data objects to keep them secure. Embodiments transparently create and maintain encryption of data objects consistent with permissions (to access) even as they vary. By using encryption just to prevent non-authorized viewing of any data object, this embodiment eliminates the need for users to expend any additional effort to have secure exchanges.

A public system for secure document exchange is provided in an embodiment. Host data object owners create Forums that include people or guests (permitted viewers), data objects (such as documents), and visual presentations that allow effortless control and management of permissions to access data objects. A host data object owner can deliver to and obtain permission to view data objects from any other user in the Forum. A guest data object owner can only deliver to and receive data objects from the Forum host. In an embodiment, an encryption method symmetrically protects access permission from host, or data object owner to guest, or permitted viewer, and from guest to host. All of the Forums in which a user is a host or a guest are accessed via a single login and a single password. Hosts completely control what data objects and what guest users are in a Forum, and which data objects can be accessed by which guests. Guests get all documents delivered to and decrypted for them in their guest Forum (passively without any additional effort) and hosts get documents delivered to and decrypted for them in their Forum without additional effort.

A transparent system, processing device, computer program and method encrypts an owner's data object, initiated by the owner's password. Transparent decrypted access to each user (dynamically) in which the data object owner permits to access the data object is provided via a unique path exclusively activated by each permitted viewer's single password. Owners provide data objects, such as a word-processing file, that are transparently encrypted using an object key unique to that object. Each object key is then wrapped with each owner's master key. Each owner's master key is wrapped with a key that is never stored, and can be dynamically created from that owner's password. A data object owner may selectively permit permitted viewers to access a data object. To honor changeable permissions and provide decrypted access as appropriate, encrypted data objects are stored with paired keys. Permitted viewers are given decrypted access to data objects via the object key wrapped by a duplicable key (called the paired key), through a process activated by their password upon their request to access it. All owners and permitted viewers are not aware that the data objects have been stored as encrypted data objects, or that the data objects have been decrypted for viewing through the use of encryption keys. All owners and permitted viewers also do not have to manage or maintain the keys used for encryption and decryption; they only need to manage and maintain their single password, entered once at each login, to view any and all documents they own or are permitted to view.

In an embodiment, decryption requires a data object owner (or permitted viewers) to login and re-enter their password in order to derive a key used in decrypting stored encrypted data objects. The data object owner and permitted viewers' passwords are not stored anywhere after being temporally stored to derive the key used in decrypting decrypted data objects. Consequently, if anyone gains unauthorized access to the stored encrypted data objects, since the essential passwords to decrypt the encrypted data objects are not available, there is generally no way to decrypt the encrypted data objects in an embodiment.

In an embodiment, a method receives information indicating user identification and their single password from a first user. A data object is received and encrypted using an (unique, randomly generated) object key. Later when permission is granted to a permitted viewer, the object key is wrapped with a duplicable key generated using the private key of the data object owner and the public key of the specific permitted viewer, obtaining a paired key (a different paired key is similarly created for each additional permitted viewer). The encrypted data object is stored with the paired key(s). Later when a permitted viewer makes a request to access the data object the appropriate paired key is unwrapped with a duplicate key, computed from the private key of the permitted viewer and the public key of the data object owner (only when the permitted viewer requests to access the data object in an embodiment), obtaining the object key. The object key is used to decrypt the data object, and the permitted viewer has the decrypted object available for viewing.

In another embodiment, a method performed by a processing device includes receiving the user identifier for a data object owner and the password associated with the user identifier. A master key, a private key and a public key are associated with the owner and a private key and a public key is associated with a permitted viewer. The private key of the owner is wrapped with the master key of the owner. The private key of the permitted viewer is wrapped with the master key of the permitted viewer. The master key of the owner is wrapped with a key derived from the password of the owner. A data object key is generated. A data object is encrypted with the data object key to obtain an encrypted data object. A duplicable key is created from the private key of the owner (that has been unwrapped using the master key that has been unwrapped with a key derived from the password of the data object owner) and the public key of the permitted viewer. The data object key is wrapped with that duplicable key to obtain a paired key. The encrypted data object and the paired key are then stored.

In an embodiment, the method further includes associating a public key with the owner and a private key with a permitted viewer. A duplicate key is obtained from the public key of the owner and the private key of the permitted viewer (that has been unwrapped using the master key of the permitted viewer unwrapped with a key derived from the password of the permitted viewer). The paired key is unwrapped by the duplicate key, producing the object key. The encrypted data object is decrypted using the object key but not until it is accessed by the permitted viewer.

In still another embodiment, a computer program, encoded on a computer readable medium, performs operations comprising storing a master, a private and public key associated with each user.

The private keys of each user are wrapped with the master key that is wrapped with a key derived from the password of each user. When a user uploads a data object the unique data object key is generated. A data object is encrypted with the unique data object key to obtain an encrypted data object. Each duplicable key is produced from the appropriate private key of the data object owner (that has been unwrapped with the master key that has been unwrapped with the key derived from the password of the data object owner) and appropriate public key of each permitted viewer. The data object key is wrapped with each duplicable key to obtain each paired key. The encrypted data object is stored with the paired key. A duplicate key is calculated from the public key of the data object owner and the private key of each permitted viewer.

In an embodiment, the managing of permissions to access encrypted data objects by viewers includes removing one or more paired keys from a user database.

In still another embodiment, a system to decrypt a data object comprises at least one storage device and at least one processor. At least one storage device stores an encrypted data object, paired key, wrapped master key for a data object owner, wrapped private key for a data object owner, public key for a data object owner, wrapped master key for a permitted viewer, wrapped private key for a permitted viewer, public key for a permitted viewer, and session information all users. At least one storage device stores executable machine-readable instructions for controlling the processor. Then at least one processor is operative with the executable machine readable instructions to: receive a data object owner identification and password; wrap and unwrap the master key of the data object owner with a key derived from the password of the owner; wrap and unwrap the master key of the data object owner with the session cookie; wrap and unwrap the private key of the data object owner with the master key of the owner; generate a data object key; encrypt the data object with the data object key to obtain the encrypted data object; create a duplicable key from the private key of the data object owner and the public key of the permitted viewer; wrap and unwrap the master key of the permitted viewer with the session cookie; wrap the data object key with the duplicable key to obtain the paired key; receive a permitted viewer identification and password; wrap and unwrap the master key of the permitted viewer with a key derived from the password of the permitted viewer; wrap and unwrap the private key of the permitted viewer with the master key of the permitted viewer; calculate a duplicate key from the public key of the data object owner and the private key of the permitted viewer; unwrap the paired key with the duplicate key to obtain the object key; and decrypt the encrypted data object using the object key.

FIG. 1 illustrates a system 100 to receive and provide data objects between object owners and permitted viewers, and to encrypt and decrypt them for selected users permitted access to data objects by the data object's owner according to an embodiment. Data object owner processing device 105 uploads data object 112 to an Encryption/Decryption (E/D) processing device 101 via Internet 104. E/D processing device 101 along with E/D software 102 encrypts data object 112 using a process initiated by password 111 entered by data object owner 106. The encrypted data object 110 (an encrypted version of data object 112) is then stored along with an associated paired key 114 for a particular permitted viewer, as described in detail below, in storage device 103.

In an embodiment, communication between E/D processing device 101 and data object processing device 105 and permitted viewer processing device 107 are protected with industry standard technology. In an embodiment, this protection can be SSL (secure socket layer) or TLS (transport layer security), as defined in RFC 2246, RFC 4346, RFC 2818, and RFC 5246.

Data object owner 106 is not aware that data object 112 has been encrypted; only that it has been stored. The encryption process is transparent to all data object owners and permitted viewers. Data object owner 106 did not have to interact in the encryption process (other than entering the password 111 and uploading or transferring data object 112 to E/D processing device 101). Data object owner 106 does not have to maintain or keep track of one or more keys used in encryption of data object 112 or other data objects. Similarly, data object owner 106 does not have to initiate or run encryption or decryption software for a selected permitted viewer 108 to view a decrypted data object 109. Data object owner 106 merely grants permission to permitted viewer 108 to produce a decrypted data object 109 (or data object 112 that was originally transferred from data object owner processing device 105 to E/D processing device 101) from permitted viewer processing device 107.

When permission is granted, permitted viewer 108 views decrypted data object 109 from permitted viewer processing device 107. Upon a request from permitted viewer processing device 107, using a process initiated by permitted viewer's password 113, E/D processing device 101 and E/D software 102 to decrypt encrypted data object 110 stored in storage device 103 and provide decrypted data object 109 to permitted viewer processing device 107 via Internet 104.

Similar to data object owner 106, permitted viewer 108 does not have to maintain or keep track of one or more keys used in decryption of encrypted data object 110 or other permitted data objects. Similarly, permitted viewer 108 does not have initiate or run decryption software to view a decrypted data object 109. Permitted viewer 108 is not aware that they are viewing a decrypted data object in an embodiment.

In an embodiment, E/D processing device 101, E/D software 102 and storage device 103 stores a plurality of encrypted data objects for a plurality of respective data object owner 106, and a plurality of paired keys 114 (a paired key 114 per encrypted data object 110 per permitted viewer 108). Each data object owner 106 then may provide permission to access the decrypted data objects 109 to one or more selected permitted viewers. In an embodiment, E/D processing device 101, E/D software 102 delivers to each user their system that may be accessed by them in order to store encrypted data objects and view decrypted data objects.

In an embodiment, Asynchronous JavaScript and Extensible Markup Language (XML) (also known as AJAX) is used to transfer information between data object processing device 105/permitted viewer processing device 107 (clients) and E/D processing device 101 (server). AJAX are interrelated web development methods or software used on a client processing device to create asynchronous web applications. With AJAX, web applications on a client can send data to, and retrieve data from, a server processing device asynchronously (in the background) without interfering with the display and behavior of the existing page. Data can be retrieved using the XMLHttpRequest object. In an embodiment, XML is replaced with JavaScript Object Notation (JSON). In further embodiments, the requests are not asynchronous.

In an embodiment, AJAX is a group of methods or software. Hypertext Markup Language (HTML) and Cascading Style Sheets (CSS) can be used in combination to mark up and style information. The Document Object Model (DOM) is accessed with JavaScript to dynamically display, and to allow the user to interact with the information presented. JavaScript and the XMLHttpRequest object provide a method for exchanging data asynchronously between browser on the client and server to avoid full page reloads.

In embodiments, a data object may be a document, text, data, database, chart, word processing file, spreadsheet, e-mail message, text message, image, graphics file, backup file, archive file, compressed file, temporary file, printer file, executable software program, script, binary file, audio file, animation file, game file, application, video, music, movie, computer language, web page and equivalents thereof, singly or in combination.

In an embodiment, processing devices 101, 105 and 107 are coupled to and communicate by way of Internet 104. In embodiments, system 100 may have far greater or fewer processing devices. In embodiments, a processing device may represent multiple hardware components or a network of distributed processing devices or hardware components. Processing devices may be coupled to Internet 104 by way of a wired or wireless connection, singly or in combination. In an embodiment, processing devices 101, 105 and 107 are general purpose computers.

In embodiments, a processing device may include one or more of a mainframe computer, server, laptop computer, hand-held computer/pad, personal digital assistant, a telephone, a cellular telephone, email device, an information appliance, or an equivalent. In an embodiment, a processing device includes at least one integrated circuit processor that executes machine readable instructions (software programs) stored on an internal or external storage device.

For convenience and in order to clearly describe embodiments, data objects are described herein as being transferred or accessed by processing devices; however, one of ordinary skill in the art understands that a processing device as well as associated software transfers data objects or allows access to data objects.

In an embodiment, a data object such as a HTML document may be accessible from E/D processing device 101 via Hypertext Transfer Protocol Secure (HTTPS), a protocol that transfers information from a processing device to another processing device in response to a request. An HTTPS request is included in a TCP/IP message/packet. In particular, a HTTPS request is nested inside TCP (Transmission Control Protocol) messages which are contained in IP (Internet Protocol) messages which contain information about the destination processing device, the originating processing device the ports the message belongs, and the lifespan of the message. While an embodiment uses the TCP/IP message/packet protocol, other protocol embodiments may be similarly used for generating similar requests and/or messages between processing devices.

In an embodiment, one or more processing devices in system 100 include an HTML-compatible browser to view HTML web pages. In an embodiment, a browser accepts cookies or data stored in a browser from E/D processing device 101. In an embodiment, decrypted HTML documents are provided from at least E/D processing device 101 to processing devices 105 and 107 in response to a request.

HTML provides basic document formatting and allows "links" or "hyperlinks" to other processing devices (or servers) and files. A link such as a URL has a specific syntax that identifies a network path to a server for defining a network connection. Embedded hyperlinks on a given web page can be used to find information related to the given web page. By clicking on a hyperlink in one web page, the user can display another related web page; data object or even invoke a related software program.

I. Software Architecture

Figure 2A:
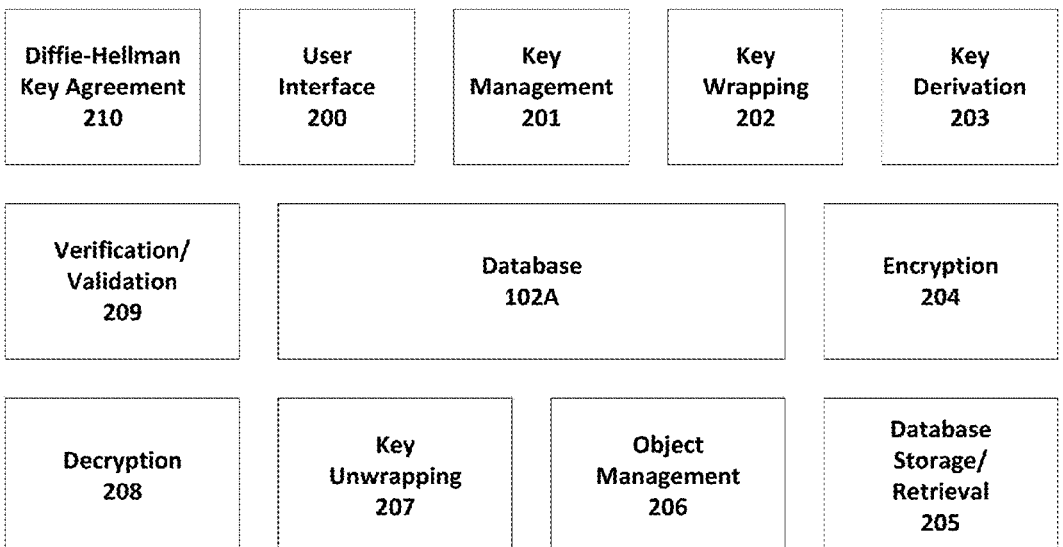
FIGS. 2A-B illustrate a software architecture of encryption/decryption software 102 and database 102a illustrated in FIG. 1 according to an embodiment.
Figure 2B:
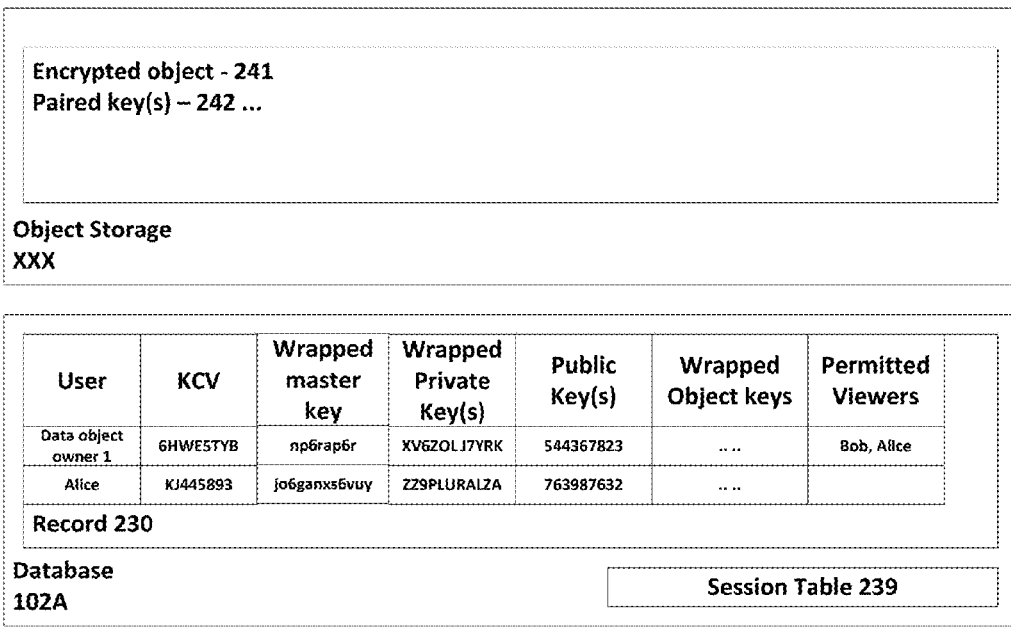

FIGS. 2A-B illustrate a software architecture of E/D software 102 illustrated in FIG. 1 according to an embodiment.

FIG. 2A illustrates software components of software 102 that may be executed on E/D processing device 101, shown in FIG. 1, to provide and store encrypted data objects and decrypt data objects. In an embodiment, E/D software 102 includes machine/computer readable or executable instructions. In an embodiment, software 102 is stored in an article of manufacture, such as a computer readable medium that may be removable from or included in a processing device. For example, software 102 may be stored in a storage device such as a magnetic hard disk, an optical disk, a floppy disk, or Compact Disk Read-Only Memory (CD-ROM) as illustrated in FIG. 1, Random Access Memory (RAM), Read-Only Memory (ROM), Electrically Erasable Programmable Read-Only Memory (EEPROM) or other readable or writeable data storage devices or technologies, singly or in combination. In alternate embodiments, software 102 may be transferred by an electronic signal or downloaded by way of the Internet using wired and/or wireless connections.

In embodiments, FIG. 2A illustrates software components that may include a software program, software object, software function, software subroutine, software method, software instance or a code fragment, singly or in combination. In embodiments, software components illustrated in FIG. 2A have at least functions described in detail below.

A. User Interface 200

User Interface 200 is responsible for providing a user interface for users as data object owner and permitted viewers. In an embodiment, user interface 200 provides a login page for all users (data object owners and permitted viewers) to enter their unique user identifier and password. User interface 200 may also provide a method to access data objects that may be represented by icons or links that may be "clicked on" by users to access and view decrypted data objects. User interface 200 also provides an interface to a data object owner that allows the data object owner to add, remove and change permissions for which permitted viewers may view or not view particular data objects. Through user interface 200, permitted viewers are allowed access to encrypted data objects by the data object owners.

B. Key Management 201

Key Management 201 is responsible for creating and assigning a unique set of master, public, and private keys for each user. Key Management 201 is also responsible for dynamically maintaining a data object key ring of object keys used to encrypt data objects. Key Management 201 is also responsible for creating private, public and paired keys used by permitted viewers to decrypt data objects.

In an embodiment, a private key should contain the dataset (a, g, p), where a is a randomly generated number that is an appropriate length, g is the generator and p is a safe prime of appropriate length. In an embodiment, g is always 2. In an embodiment, prime numbers are computed in advance, as it may take a considerable amount of time to find a suitable prime number. In an embodiment, a private key is wrapped with the user's master key and stored in database 102a.

In an embodiment, a respective public key should contain the dataset (A, g, p), where $A=(g^a \bmod p)$, and the values for g and p are the same as the private key. In an embodiment, a public key is not wrapped or encrypted, and stored in database 102a.

Figure 3A:
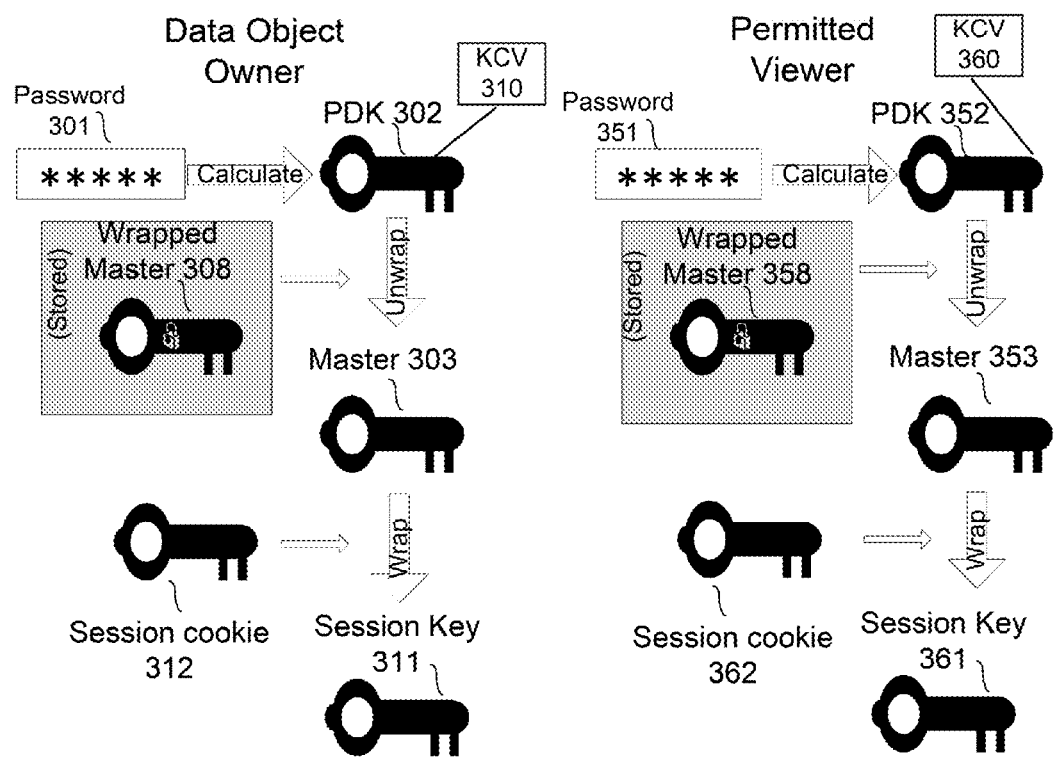
FIG. 3A-C illustrates keys created and used in user login, encrypting and decrypting data objects according to an embodiment.
Figure 3B:
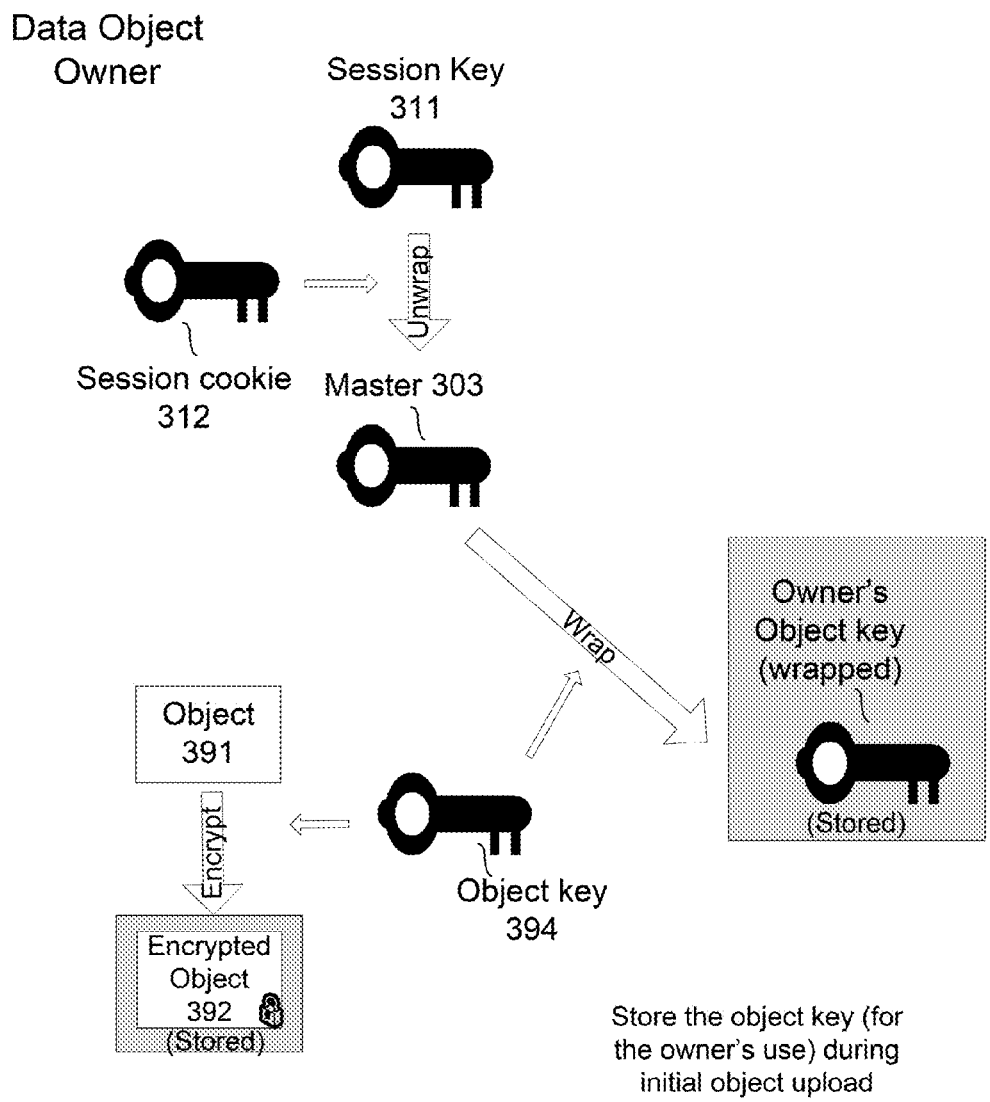

Key management 201 also is responsible for creating and maintaining an object key ring for each data object owner. The object key ring includes the object keys to the respective encrypted data objects owned by a data object owner. Each object key is wrapped with the user's master key as described in detail below (Key Wrapping 202 and as illustrated in FIG. 3B) and stored in database 102a, as illustrated in FIG. 2B.

Figure 3C:
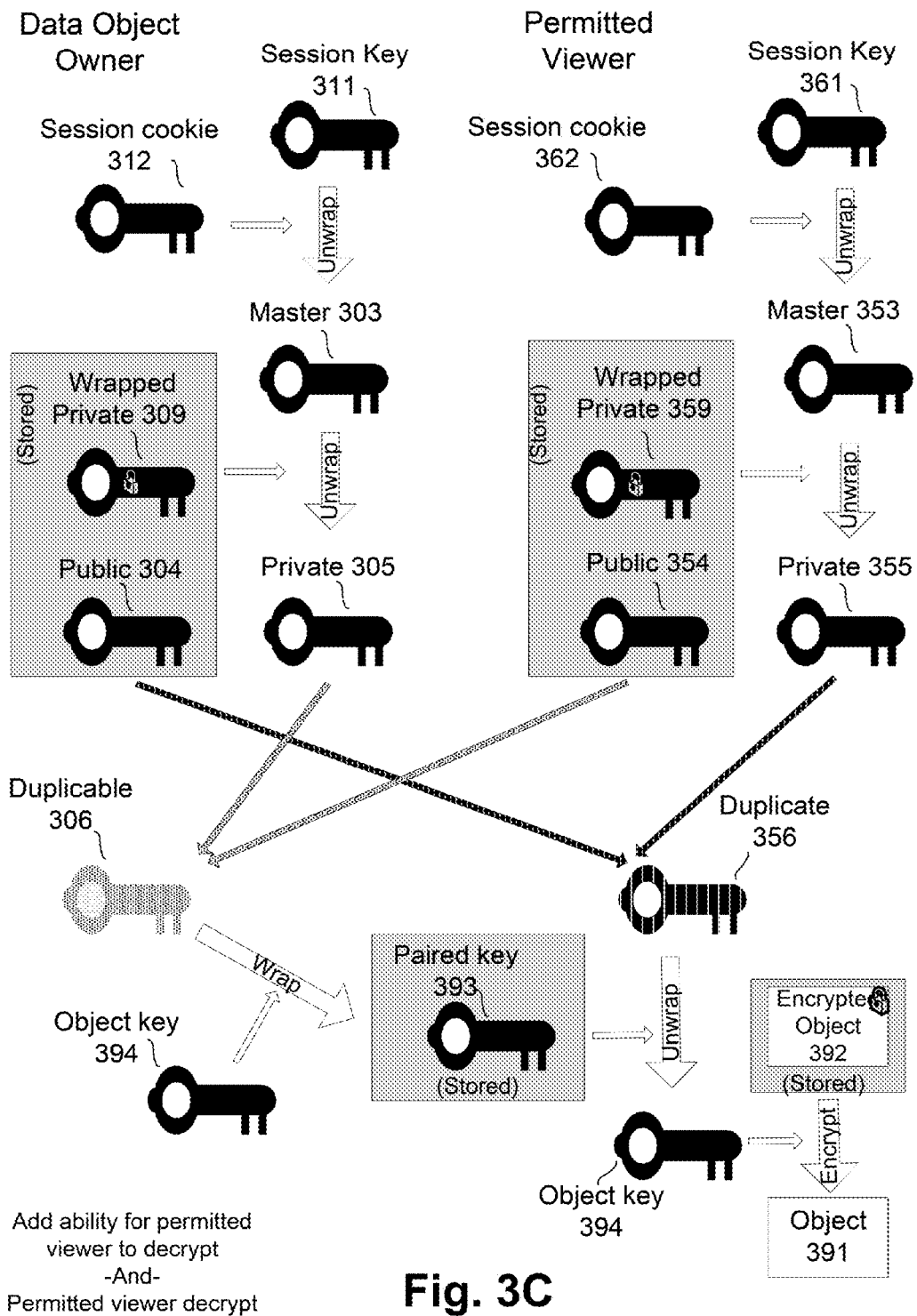

As illustrated in FIG. 3C, a data object owner will have a private key 305 and public key 304 assigned while the permitted viewer will have a private key 355 and public key 354. Encrypted object 392 has a corresponding object key 394. FIG. 2B also illustrates how each data object owner, such as data object owner 1, and permitted viewer, such as Alice, has respective public and private keys stored in record 230 of database 102a. A permitted viewer will be able to access or view a decrypted version of encrypted data object 392 (or object 391) using duplicate key 356 and paired key 393 described in detail below.

To allow a permitted viewer to access an encrypted data object 392, first a duplicable key 306 is created. In an embodiment, a duplicable key 306 is created by combining private key 305 of the data object owner and public key 354 of the permitted viewer, as described in detail below (Diffie-Hellman 210). The g and p of the permitted viewer are used when creating the duplicable key 306.

Next, a paired key is created, such as paired key 393 illustrated in FIG. 3C. This is accomplished by wrapping a data object key 394 with the duplicable key 306 as the KEK. This creates a paired key 393 that is paired to a specific encrypted data object 392 for a specific permitted viewer. In an embodiment, a paired key 393 is stored with the encrypted data object 392 in database 102A (illustrated as encrypted object 241 and paired key 242).

Once a paired key 393 is stored with an encrypted data object 392, the permitted viewer, upon request to decrypt data object 392, initiates the calculation of the duplicate key 356 to unwrap the paired key 393 and decrypt the encrypted data object 392. The g and p of the permitted viewer are used when creating the duplicate key 356.

When the data object owner's public key 304 is unreadable or cannot be accessed, the duplicate key 356 cannot be calculated, paired key 393 cannot be unwrapped, and encrypted data object 392 cannot be decrypted by the permitted viewer 108 requests'. In an embodiment, a permitted viewer's ability to view a decrypted data object is revoked by denying the previously permitted viewer object key 394 through the process of erasing paired key 393.

C. Key Wrapping 202

Key Wrapping 202 is responsible for encapsulating (or encrypting) cryptographic key information or keys. In an embodiment, keys are wrapped using the AES Key Wrap Algorithm defined by RFC 3394, which provides authenticated encryption of AES keys. In an embodiment, this has the benefit of not needing additional verification that a key was decrypted correctly.

D. Key Derivation from User Password 203

Key Derivation from user Password (or Key Derivation) 203 is responsible for deriving a key from a user's password (either a data object owner or permitted viewer) that will be used as a Key Encryption Key (KEK). In an embodiment, a Password Based Key Derivation Function 2 (PBKDF2) software in section 5.2 of RFC 2898 is used to obtain the derived key (PDK or PBKDF2 key). As illustrated by FIG. 3A, the data object owner enters a password 301, which is used by PBKDF2 software to obtain PDK (derived key) 302. Similarly, the permitted viewer enters a password 351 which is used by a PBKDF2 software to obtain PDK 352.

Using PBKDF2 is necessary, because a typical user password lacks enough entropy to adequately protect a static private key. There are two basic mechanisms to help mitigate this. One is using a salt. A salt is just a random number added to and stored alongside the password. A salt makes it difficult to pre-compute all the possible password combinations (i.e. rainbow tables). The second mechanism is called key stretching. Key stretching adds a variable computation requirement to validate a password or in other words how many iterations of PBKDF2 software is performed. PBKDF2 software uses both mechanisms.

i. Passwords

Encryption described herein is dependent on each user's unique password being input to PBKDF2 software to generate a PDK that wraps and unwraps the user's unique master key. To help protect the confidentiality of the user's master key, the PDK is not stored anywhere in an embodiment. The unique user PDK is generated each time a user presents their password at login in, and is used exactly once per login to unwrap the user's master key and rewrap their master key with a session key in an embodiment as described in Verification/Authentication 209.

When generating derived keys, the goal is to make the computation sufficiently expensive that dictionary attacks are impractical. The salt value used should be equal to the length of the output of the generated key (e.g. 256-bit salt for a 256-bit key). The number of iterations used should such that it takes between 400 ms and 800 ms to validate a password in an embodiment, and should be occasionally incremented as computing power increases.

ii. Key Check Values (KCVs)

Using a PDK to wrap keys presents a challenge for authentication as described in Verification/Authentication 209 described below. While an unwrapped key can be validated when the PDK encrypting key is available (at first log in), because the PDK is not stored anywhere in an embodiment, it cannot be referenced to authenticate subsequent requests. However, a key check value (KCV) calculated with a PDK may be alternatively used for authentication in an embodiment, such as KCV 310 and KCV 360 illustrated in FIG. 3A. A KCV can be derived by slightly modifying the PBKDF2 algorithm defined in RFC 2898 as illustrated in Table I below.

Both the PDK and KCV are created identically until the next to last iteration. At the next to last iteration, the intermediate value is padded with four octets of zeros, hashed with the pseudorandom function as normal and saved as the KCV. Because of the properties of hash functions, the KCV is independent of the PDK in an embodiment.

In an embodiment, the following test vectors are used to validate KCV generation in conjunction with the test vectors from RFC 6070:

DK=0c60c80f961f0e71f3a9b524af6012062fe037a6 (single iteration)
KCV=0c60c80f961f0e71f3a9b524af6012062fe037a6
DK=ea6c014dc72d6f8ccd1ed92ace1d41f0d8de8957
KCV=6b953bc49cc3167061a73b892237a8f157a973b3
DK=4b007901b765489abead49d926f721d065a429c1
KCV=8a5b81c16473b935359f47040e720e7c25284b3c
DK=eefe3d61cd4da4e4e9945b3d6ba2158c2634e984
KCV=5d58e036cfe7e26a5bb30c7ceb9b5c7c8521c068
DK=3d2eec4fe41c849680c8d83662c0e44a8b291a964cf2f07038

KCV=910f619d8b1432ff013e9bb8ea5d145fadae7e5548e3ddae68
DK=56fa6aa75548099dcc37d7f03425e0c3
KCV=7d2296d995aab6f12f6d02b98d3f0068

As can be seen above, the test vector for the single iteration has the same PDK and KCV. This is because with a single iteration, there is no previous intermediate value to create a different hash value.

iii. Modified PBKDF Algorithm to Define a KCV

In an embodiment, the PBKDF2 software, defined in RFC 2898, is modified as shown below Table I. The underlined code section in Table I show a modification that define a KCV that provides the ability to validate a password without storing the password itself, or the key that results from the password.

TABLE I

```
sub pbkdf2 {
    my($pass, $salt, $iter, $len, $prf) = @_;
    my($key, $kcv, $block, $u, $ui, $i); $key = $kcv = q{ };
    for ($block = 1; length($key) < $len; $block++) {
        $u = $ui = &$prf($salt . pack('N', $block), $pass);
        for ($i = 1; $i < $iter; $i++) {
            if ($i == ($iter – 1)) {
                $kcv .= &$prf($u . pack('N', 0), $pass);
            }
            $ui = &$prf($ui, $pass);
            $u ^= $ui;
        }
        $kcv .= $u if $iter == 1;
        $key .= $u;
    }
    return substr($key, 0, $len), substr($kcv, 0, $len);
}
```

E. Encryption 204

Encryption 204 is responsible for encrypting data objects. In an embodiment, each data object, such as an uploaded data file, is encrypted via AES in counter (CTR) mode with a 64-bit nonce (the data object id), a 64-bit counter and a randomly generated 128-bit cipher key. In CTR mode, reusing a key and nonce should be avoided by making sure a nonce is only used once or by making the key randomly generated. Having a randomly generated key and a unique data object id further enhances security.

In an embodiment, CTR mode is preferred as it is capable of random access within the key stream, and can be implemented in parallel. This is particularly useful with large data objects, making it possible to decrypt an arbitrary byte range without having to decrypt the entire data object, and the ability to scale performance of encryption and decryption.

F. Database Storage/Retrieval 205

Database storage/retrieval 205 is responsible for storing and retrieving data, such as (but not limited to) user information, user public/private keys, key chains, paired keys, and session information from database 102A.

G. Object (File) Management 206

Object (file) management 206 is responsible for managing encrypted data objects. In an embodiment, Object management 206 associates data objects with their respective data object owners and paired keys (which permit access to permitted viewers).

H. Key Unwrapping 207

Key Unwrapping 207 is responsible for unwrapping a wrapped key. In an embodiment, a wrapped key is unwrapped using the AES Key Unwrap Algorithm as defined by RFC 3394. In an embodiment, this has the benefit of not needing additional verification that a key was decrypted correctly.

I. Decryption 208

Decryption 208 is responsible for decrypting data objects. In an embodiment, an encrypted data object is decrypted via AES in counter (CTR) mode with a 64-bit nonce (the data object id), a 64-bit counter and the appropriate 128-bit cipher key.

J. Verification/Authentication 209

Verification/Authentication 209 is responsible for verifying whether a password and user identifier entered by a user is valid and authenticating a user's request. To authenticate the user identifier and password, the derived KCV of the received password is compared with the user's stored KCV. In an embodiment, the PDKs 302/352 and KCVs 310/360 are derived from the user's passwords 111/113 as illustrated in FIG. 3A, and compared with the stored KCVs (a KCV for data object owner 1 and Alice, a permitted viewer) from record 230 as illustrated in FIG. 2B. In an embodiment, key derivation 203 and database storage/retrieval 205 performs these functions. In an embodiment, the PDKs 302/352 are used to unwrap the users master keys 308/358. In an embodiment, key unwrapping 207 performs this function. The unwrapping of the user's master key provides additional verification beyond the initial verification of the user's KCV. In an embodiment, the user's master keys 308/358 are wrapped with a randomly generated session cookies 312/362 to provide session keys 311/361 that are stored in the session table 239 as illustrated in FIG. 2B. The session keys 311/361 are used by the user for subsequent requests without the need to re-enter the user's passwords 301/351. In an embodiment, session cookies 312/362 are stored or set in the user's processing device 105/107 so that they may be used to unwrap a stored session key to obtain a master key in subsequent user requests.

K. Diffie-Hellman Key Agreement 210

Diffie-Hellman 210 is responsible for creating the duplicable keys 306 used in the creation of paired keys 393 as illustrated in FIG. 3C. Diffie-Hellman 210 is also responsible for creating the duplicate keys 356 used to unwrap paired keys 393 as illustrated in FIG. 3C. In an embodiment, public key 305 of a data object owner and private key 354 of a permitted viewer are used with the Diffie-Hellman key agreement protocol defined by section 2.1 of RFC2631 to create the duplicable key 306. In an embodiment, public key 304 of data object owner and private key of permitted viewer 355 are used with the same Diffie-Hellman key agreement protocol to create the duplicate key 356. Table II below describes the differences between duplicate and duplicable keys in an embodiment:

TABLE II

| Duplicable | Item designation | FIG. 3C - Item 306 |
|---|---|---|
| | Used on behalf of? | Data object owner |
| | What operation? | Key wrap |
| | What are inputs? | Private - Data object owner |
| | | Public - Permitted Viewer |
| Duplicate | Item designation | FIG. 3C - Item 356 |
| | Used on behalf of? | Permitted viewer |
| | What operation? | Key unwrap |
| | What are inputs? | Private - Permitted Viewer |
| | | Public - Data object owner |

When a user logs in to a website provided by E/D processing device 101, their login name and password are verified, a session is created, their master key is unwrapped and a number of cookies are set to allow them to authenticate subsequent requests, as illustrated in FIG. 3A.

FIG. 2B illustrates a user database or database 102a according to an embodiment. In order to avoid obscuring descriptions of embodiments, only some of the information stored in database 102a is illustrated in FIG. 2B. One of ordinary skill in the art would understand that other information not illustrated is also stored in database 102a.

In an embodiment, user data is stored in database 102a in the form of a data structure. In an embodiment, a data structure includes one or more records, with each record having one or more contiguous fields to store information. Each field may include one or more bits of information.

In an embodiment, database 102a includes respective records for respective data object owners. In an embodiment, database 102a also includes respective records for respective permitted viewers. For example, record 230 illustrates storing information related to "Data object owner 1" in the first field of record 230. For each data object owner or permitted viewer, various fields in the record may include, but are not limited to, associated information such as a KCV, data object owner public keys, data object owner private keys, data object owner's permitted users (or identifiers), permitted user public keys, permitted user private keys, encrypted data object keys and paired keys. In an embodiment, a field may include an identifier or address to such information.

In alternate embodiments, other data structures and other information may be stored in database 102a. In an embodiment, database 102a includes session table 231.

Figure 4B:
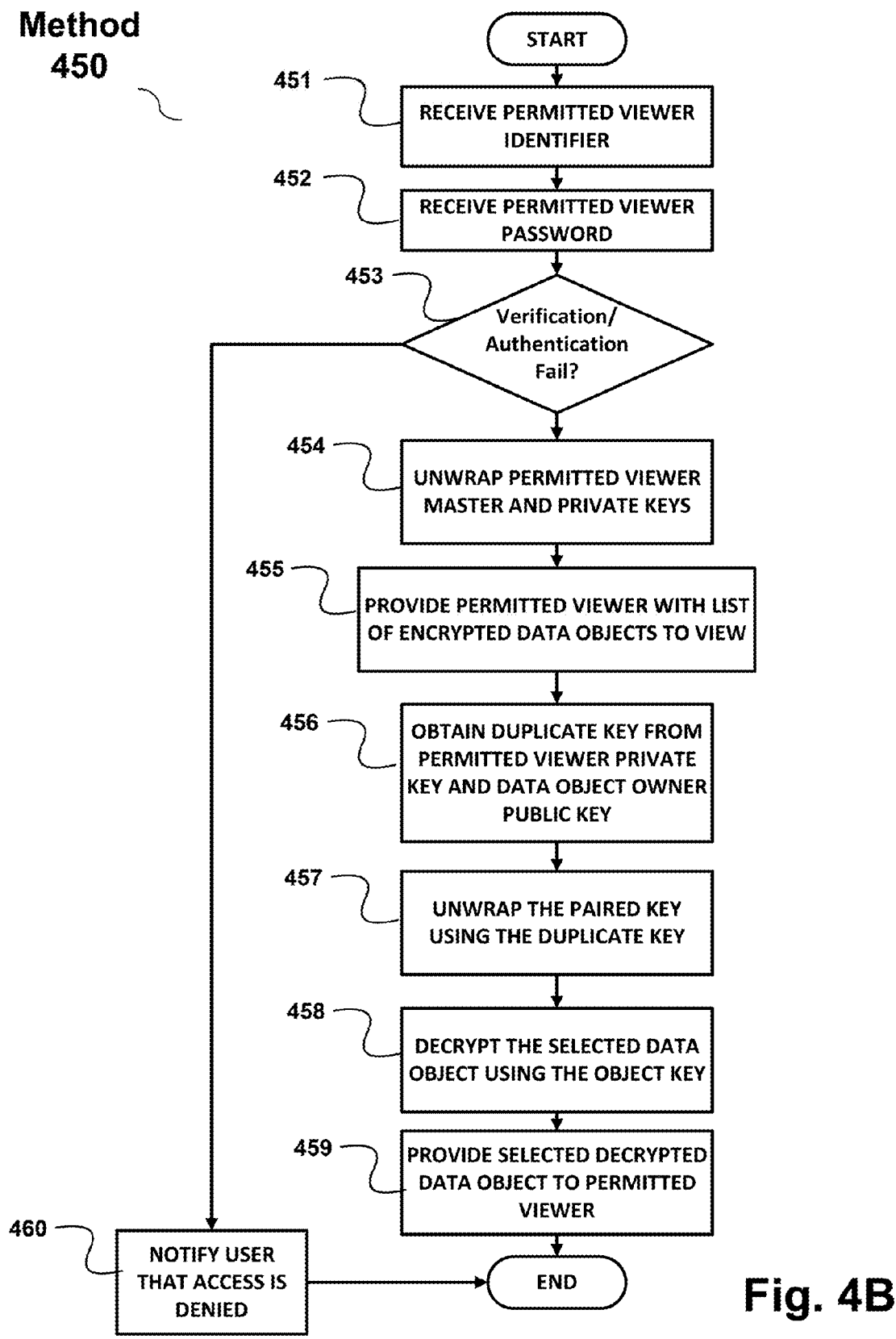

FIGS. 4A-B are flow charts to illustrate a method 400 of encrypting a data object and a method 450 of decrypting a data object. In an embodiment, FIGS. 4A-B illustrate the operation of system 100 shown in FIG. 1. As one of ordinary skill in the art would appreciate, FIGS. 4A-B illustrate logic boxes or steps for performing specific functions. In alternate embodiments, more or fewer logic blocks or steps are used. In an embodiment, a logic block or step may represent at least partial execution of a software component as well as execution of a hardware/processor operation or user operation, singly or in combination. For example, many logic blocks in FIGS. 4A-B represent the execution of software components illustrated in FIG. 2A by E/D processing device 101 shown in FIG. 1.

Method 400 begins by receiving a user identifier and password as illustrated by logic blocks 401 and 402. For example, data object owner 106 enters their user identifier and password 111 into object owner processing device 105 for a website provided by E/D processing device 101 as illustrated in FIG. 1. In an embodiment, user interface 200 provides a login web page for a user to enter their assigned user identifier and user created password 111. User interface 200 along with E/D processing device 101 then receives the entered user identifier and password 111. In an embodiment, a user's associated master, private, and public keys along with other associated information are created/assigned and stored in database 102a when a user creates an account or at first login. For example, a data object owner and permitted viewer's assigned master keys are encrypted using their entered passwords by key derivation 203 and their private keys are wrapped with their master keys and then the wrapped keys stored in database 102a in an embodiment. Conversely, assigned/created public keys are stored in database 102a but not encrypted in an embodiment.

Logic block 403 illustrates verifying and authenticating a user when they login or request a service. In an embodiment, Verification/Authentication 209 performs this function as described herein. The user is authenticated by comparing KCV 310 (as illustrated in FIG. 3A) to the stored KCV in database 102a, and further authenticated by unwrapping wrapped master key 308 with PDK 302 and checking the integrity of the unwrap process (as defined in Key unwrapping 207). When a user is not verified or authenticated, control transitions to logic block 410 where the user is denied access and notified. Method 400 then ends. When a user is verified and authenticated, wrapped master key 308 is unwrapped with PDK 302 yielding master key 303, session cookie 312 is generated, master key 303 is wrapped with session cookie 312 yielding session key 311, session key 311 is stored in session table 239, and session cookie 312 is delivered to a processing device of the user for subsequent requests. Control then passes to logic block 404.

Logic block 404 illustrates unwrapping the data object owner's master key and appropriate private keys with the session key 312 and session cookie 311, as illustrated in FIG. 3B. In an embodiment, the session cookie 312 is received from data object owner processing device 105 by E/D processing device 101, session cookie 312 is used to unwrap the session key 311 yielding data object owner's master key 303, and the data object owner's master key 303 is used to unwrap the appropriate private key 305 as illustrated in FIG. 3C. In an embodiment, E/D processing device 101 and key unwrapping 207 performs this function. In another embodiment, if during execution of logic block 404 the appropriate private and/or public keys have not been created/assigned, the private and/or public keys are created during the creation of the duplicable key as detailed (logic block 407) below.

Logic block 405 illustrates a user providing a data object to be encrypted and stored. In an embodiment, data object owner 106 downloads or transfers a data object 112 to be encrypted by E/D processing device 101 and E/D software 102 after data object owner 106 is verified and authenticated. Further, in an embodiment, the data object 112, once delivered to E/D processing device 101, is encrypted with a randomly generated object key 394, and stored in storage device 103 as encrypted data object 392 as illustrated in FIG. 3A. In an embodiment, encryption 204 performs this function. In an embodiment, encrypted data objects and keys are stored in database 102a for associated data object owners. FIG. 3C illustrates encrypted data object 392 with object key 394. In an alternate embodiment, data object 112 was previously downloaded, encrypted and stored in database 102a, as illustrated in FIG. 3B.

Logic block 407 illustrates creating a duplicable key between a data object owner and a permitted viewer, such as duplicable key 306 illustrated in FIG. 3C, from a data object owner private key 305 and a permitted viewer public key 354. In an embodiment, key management 201 and Diffie-Hellman 210 performs this function. In another embodiment, additional public and private keys are created/assigned and stored in database 102a when required for the creation of duplicable keys. For example, before data object owner 106 creates duplicable key 306; private key 305 must be created/assigned and stored in database 102a if it does not previously exist. In an embodiment, Key management 201 performs this function.

Logic block 408 illustrates wrapping a data object key with a duplicable key as the KEK, such as object key 394 and paired key 393 illustrated in FIG. 3C. This creates a key that is paired between a specific data object owner and specific permitted viewer for a specific data object. In an embodiment, key-wrapping 202 performs this function.

Logic block 409 illustrates associating the paired key with the encrypted data object. In an embodiment, database storage/retrieval 205 and/or object management 206 stores the paired key with encrypted data object in database 102a. Method 400 then ends.

FIG. 4B illustrates method 450 for providing a data object that was encrypted by method 400 to a permitted viewer in an embodiment. In an embodiment, method 450 is performed after method 400.

Logic blocks 451 and 452 receive a permitted viewer's identifier and password similarly as described above for logic blocks 401 and 402. Also similar to above, logic block 453 and 460 verify, authenticate and notify a permitted viewer similar to logic blocks 403 and 410. Also, similar to logic block 404, logic block 454 illustrates unwrapping the permitted viewer's keys as illustrated in FIG. 3A.

Logic block 455 illustrates providing a permitted viewer that has been verified and authenticated with possible encrypted data objects to view. In an embodiment, user interface 200 and database storage/retrieval 205 provide a permitted viewer with lists of icons and/or links to respective encrypted data objects that have been provided by a data object owner to view and/or access. In an embodiment, permitted viewer 208 selects a data object to view using user interface 200, the request is sent through Internet 104 and received and processed by E/D device 101.

Logic block 456 illustrates calculating a duplicate key from the data object owner public key and the permitted viewer private key. In an embodiment, key management 201 performs this function. In an embodiment, the permitted viewer's master key 353 is used to decrypt the permitted viewer's private key 355. In an embodiment, key unwrapping 207 performs this function. In an embodiment, duplicate key 356 is created through the use of the permitted viewer's private key 355, and the data object owner's public key 304. In an embodiment, Diffie-Hellman 210 performs this function.

Logic block 457 illustrates unwrapping the paired key that has been associated with the selected encrypted data object with the duplicate key 356, as illustrated in FIG. 3C, that was calculated in logic block 456. In an embodiment, key unwrapping 207 performs this function.

Logic block 458 illustrates decrypting the selected encrypted data object using the paired key, such as paired key 292 shown in FIG. 3C. In an embodiment, decryption 208 performs this function.

Logic block 459 illustrates providing the selected decrypted object to a permitted viewer, such as decrypted data object 109 (or object 391 shown in FIG. 3C) to permitted viewer 108 illustrated in FIG. 1. In an embodiment, user interface 200 performs this function. Method 450 then ends. As one of ordinary skill in the art would appreciate, methods 400 and 450 may be repeated numerous times for numerous data object owners and permitted viewers.

Although illustrative embodiments are shown and described herein, many variations and modifications are possible which remain within the concept, scope, and spirit of the claims, and these variations would become clear to those of ordinary skill in the art after perusal of this application. Section headings are for descriptive purposes only and shall not limit embodiments described herein. Accordingly, the present embodiments are to be considered as illustrative and not restrictive, and the invention is not to be limited to the details given herein, but may be modified within the scope and equivalents of the appended claims.

We claim:
1. A method comprising:
 receiving a data object from the first user;
 receiving a private key of the first user;
 receiving identification information about the first user and a password from the first user, wherein the information and the password are received by way of a log in page;

retrieving a public key of a user specifically permitted to view the data object;
encrypting the data object using an object key;
wrapping the object key with a paired key generated using the private key of the first user and the public key of the user specifically permitted to view the data object;
storing the encrypted data object with the wrapped object key;
receiving a request to access the encrypted data object from a second user;
obtaining a private key of the second user;
unwrapping the object key using a duplicate key computed from the private key of the second user and a public key of the first user a key providing a decryption key to decrypt the encrypted data object using key information from the first user and key information from the second user;
decrypting the encrypted data object using the object key; and
providing the decrypted data object to the second user;
receiving information indicating user identification from the second user; and
receiving a password associated with the information indicating user identification from the second user, and
providing other decrypted data objects provided by the first user to the second user when permitted by the first user after receiving the information indicating user identification from the second user and the associated password.

2. The method of claim 1, wherein the first and second users are not notified of the encrypting and decrypting, and wherein only the first user and one or more permitted users, including the second user, are able decrypt the encrypted data object.

3. The method of claim 1, wherein the decrypting of the data object does not occur without providing the password associated with the information from the first user to the decrypting or permitting the second user access by the first user.

4. The method of claim 3, wherein the permitting includes enabling access to the key information from the first user to the second user.

5. A system to decrypt a data object, the system comprising:
at least one storage device to store one or more keys;
at least one processor, coupled to the storage device;
the at least one storage device to store executable machine readable instructions for controlling the processor; and
the at least one processor is operative with the executable machine readable instructions to:
receive a data object from the first user;
receive a private key of the first user;
receive identification information about the first user and a password from the first user, wherein the information and the password are received by way of a log in page;
retrieve a public key of a user specifically permitted to view the data object;
encrypt the data object using an object key;
wrap the object key with a paired key generated using the private key of the first user and the public key of the user specifically permitted to view the data object;
store the encrypted data object with the wrapped object key;
receive a request to access the encrypted data object from a second user;
obtain a private key of the second user;
unwrap the object key using a duplicate key computed from the private key of the second user and a public key of the first user a key providing a decryption key to decrypt the encrypted data object using key information from the first user and key information from the second user;
decrypt the encrypted data object using the object key;
provide the decrypted data object to the second user;
receive information indicating user identification from the second user; and
receive a password associated with the information indicating user identification from the second user, and
provide other decrypted data objects provided by the first user to the second user when permitted by the first user after receiving the information indicating user identification from the second user and the associated password.

6. The system of claim 5, wherein the private key of the first user contains the dataset (a, g, p), wherein a is a randomly generated number, g is the generator, and p is a safe prime.

7. The system of claim 6, further comprising obtaining an identification and password from the first user and storing the information and password.

8. The system of claim 6, wherein the public key of the first user includes the dataset (A, g, p), where $A=g^a \pmod p$.

9. The system of claim 5, wherein encrypting the data object includes using Advanced Encryption Standard encryption function in counter mode (CTR) with a 64 bit nonce of a data object id of the data object, a 64 bit counter and a randomly generated 256-bit cypher key as the data object key.

10. The system of claim 5, wherein the duplicable key is created using a Diffie-Hellman Key Agreement method (RFC 263) for the private key of the second user and the public key of the second user user to obtain a result, wherein a cryptographic hash function is used with the result to obtain the duplicate key.

11. A non-transitory computer-readable storage medium comprising instructions that, when executed by at least one processor of a machine, cause the machine to perform operations comprising:
receiving a data object from the first user;
receiving a private key of the first user;
receiving identification information about the first user and a password from the first user, wherein the information and the password are received by way of a log in page;
retrieving a public key of a user specifically permitted to view the data object;
encrypting the data object using an object key;
wrapping the object key with a paired key generated using the private key of the first user and the public key of the user specifically permitted to view the data object;
storing the encrypted data object with the wrapped object key;
receiving a request to access the encrypted data object from a second user;
obtaining a private key of the second user;
unwrapping the object key using a duplicate key computed from the private key of the second user and a public key of the first user a key providing a decryption key to decrypt the encrypted data object using key information from the first user and key information from the second user;
decrypting the encrypted data object using the object key; and providing the decrypted data object to the second users;
receiving information indicating user identification from the second user; and
receiving a password associated with the information indicating user identification from the second user, and
providing other decrypted data objects provided by the first user to the second user when permitted by the first user after receiving the information indicating user identification from the second user and the associated password.

12. The non-transitory computer-readable storage medium of claim 11, wherein the first and second users are not notified of the encrypting and decrypting, and wherein only the first user and one or more permitted users, including the second user, are able decrypt the encrypted data object.

13. The non-transitory computer-readable storage medium of claim 11, wherein the decrypting of the data object does not occur without providing the password associated with the information from the first user to the decrypting or permitting the second user access by the first user.

14. The non-transitory computer-readable storage medium of claim 13, wherein the permitting includes enabling access to the key information from the first user to the second user.

15. A method comprising:
receiving a data object from the first user;
receiving a private key of the first user, wherein the private key of the first user contains the dataset (a, g, p), wherein a is a randomly generated number, g is the generator, and p is a safe prime;
retrieving a public key of a user specifically permitted to view the data object;
encrypting the data object using an object key;
wrapping the object key with a paired key generated using the private key of the first user and the public key of the user specifically permitted to view the data object;
storing the encrypted data object with the wrapped object key;
receiving a request to access the encrypted data object from a second user;
obtaining a private key of the second user;
unwrapping the object key using a duplicate key computed from the private key of the second user and a public key of the first user a key providing a decryption key to decrypt the encrypted data object using key information from the first user and key information from the second user;
decrypting the encrypted data object using the object key; and
providing the decrypted data object to the second user.

16. The method of claim 15, further comprising receiving identification information about the first user and a password from the first user.

17. The method of claim 16, wherein the information and the password are received by way of a log in page, and the method further comprises:
receiving information indicating user identification from the second user; and
receiving a password associated with the information indicating user identification from the second user,
providing other decrypted data objects provided by the first user to the second user when permitted by the first user after receiving the information indicating user identification from the second user and the associated password.

18. A system to decrypt a data object, the system comprising:
at least one storage device to store one or more keys;
at least one processor, coupled to the storage device;
the at least one storage device to store executable machine readable instructions for controlling the processor; and
the at least one processor is operative with the executable machine readable instructions to:
receive a data object from the first user;
receive a private key of the first user, wherein the private key of the first user contains the dataset (a, g, p), wherein a is a randomly generated number, g is the generator, and p is a safe prime;
retrieve a public key of a user specifically permitted to view the data object;
encrypt the data object using an object key;
wrap the object key with a paired key generated using the private key of the first user and the public key of the user specifically permitted to view the data object;
store the encrypted data object with the wrapped object key;
receive a request to access the encrypted data object from a second user;
obtain a private key of the second user;
unwrap the object key using a duplicate key computed from the private key of the second user and a public key of the first user a key providing a decryption key to decrypt the encrypted data object using key information from the first user and key information from the second user;
decrypt the encrypted data object using the object key; and
provide the decrypted data object to the second user.

19. The system of claim 18, further comprising receiving identification information about the first user and a password from the first user.

20. The system of claim 19, wherein the information and the password are received by way of a log in page, and the processor is further operative with the executable machine readable instructions to:
receive information indicating user identification from the second user; and
receive a password associated with the information indicating user identification from the second user,
provide other decrypted data objects provided by the first user to the second user when permitted by the first user after receiving the information indicating user identification from the second user and the associated password.

21. A non-transitory computer-readable storage medium comprising instructions that, when executed by at least one processor of a machine, cause the machine to perform operations comprising:
receiving a data object from the first user;
receiving a private key of the first user, wherein the private key of the first user contains the dataset (a, g, p), wherein a is a randomly generated number, g is the generator, and p is a safe prime;
retrieving a public key of a user specifically permitted to view the data object;
encrypting the data object using an object key;
wrapping the object key with a paired key generated using the private key of the first user and the public key of the user specifically permitted to view the data object;
storing the encrypted data object with the wrapped object key;

receiving a request to access the encrypted data object from a second user;
obtaining a private key of the second user;
unwrapping the object key using a duplicate key computed from the private key of the second user and a public key of the first user a key providing a decryption key to decrypt the encrypted data object using key information from the first user and key information from the second user;
decrypting the encrypted data object using the object key; and
providing the decrypted data object to the second user.

* * * * *